(12) United States Patent
Harradine et al.

(10) Patent No.: US 7,260,304 B1
(45) Date of Patent: Aug. 21, 2007

(54) RECORDING AND ACCESSING METADATA

(75) Inventors: Vince Harradine, Burlington (CA); Alan Turner, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1028 days.

(21) Appl. No.: 09/705,531

(22) Filed: Nov. 3, 2000

(30) Foreign Application Priority Data

Nov. 5, 1999 (GB) .................................. 9926321.2
Apr. 5, 2000 (GB) .................................. 0008423.6

(51) Int. Cl.
*H04N 5/76* (2006.01)
*H04N 7/00* (2006.01)
*H04N 5/00* (2006.01)

(52) U.S. Cl. ........................... 386/46; 386/65; 386/66; 386/95; 386/125

(58) Field of Classification Search ................ 386/1, 386/4, 45, 95, 52, 65, 69, 70, 125, 126, 46, 386/66; 360/72.1, 72.2; *H04N 5/76, 5/781*
See application file for complete search history.

(56) References Cited

U.S. PATENT DOCUMENTS

| 4,175,267 | A | * | 11/1979 | Tachi | 386/12 |
| 4,423,440 | A | * | 12/1983 | Tachi | 386/95 |
| 5,339,393 | A | * | 8/1994 | Duffy et al. | 715/723 |
| 5,506,689 | A | * | 4/1996 | Lim | 386/4 |
| 6,507,697 | B1 | * | 1/2003 | Fujita et al. | 386/125 |
| 2003/0095788 | A1 | * | 5/2003 | Murakami et al. | 386/52 |

FOREIGN PATENT DOCUMENTS

| GB | 2 296 601 | 7/1996 |
| GB | 2 312 078 | 10/1997 |
| WO | WO95 18449 | 7/1995 |
| WO | WO97 29484 | 8/1997 |

OTHER PUBLICATIONS

Wilkinson J. H.: "Linking Essence and Metadata in a Systems Environment" IEE NBSS Jul. 6, 1999.*
Duboyce A: "A Time Code User-Bit Hierarchy for Multidisciplinary Applications" SMPTE Journal, SMPTE Inc. Scarsdale,N.Y ,US, vol. 99, No. 12, Dec. 1, 1990, pp. 993-966, XP000172374 ISSN: 0036-1682.
Morgan O: "Wrappers and Metadata Sub Group digital video standards" IEE Colloquium on the EBU-SMPTE Task Force: Building an Infrastructure for Managing Compressed Video Systems,IEE,London,BG, 1997, pp. 5-1-5-7, XP002127283.
"Kontrollspur Mehrfach Genutzt" Funkschau,DE,Franzis-Verlag K.G. Munchen, No. 8, Apr. 10, 1987, pp. 35-38, XP000023897 ISSN: 0016-2841.

* cited by examiner

*Primary Examiner*—Thai Tran
*Assistant Examiner*—Gelek Topgyal
(74) *Attorney, Agent, or Firm*—Oblon, Spivak, McClelland, Maier & Neustadt, P.C.

(57) ABSTRACT

Apparatus uniquely identifies material recorded on an example of a recording medium. The medium has distinguishing data, a tape ID, distinguishing that example from other examples thereof recorded thereon. A generator generates data, e.g. IN and OUT time codes, identifying the or each piece of material recorded on the medium. A recorder (460) records the said distinguishing data on the medium. A reproducer (460) reproduces, from the recording medium, the distinguishing data. A processor, a PDA (469) associates the reproduced distinguishing data and the said identifying data with a unique identifier, a UMID, for the or each piece of material. A database (464) associates the unique identifier with metadata relating to the material.

14 Claims, 5 Drawing Sheets

Basic and Extended UMID Structures.

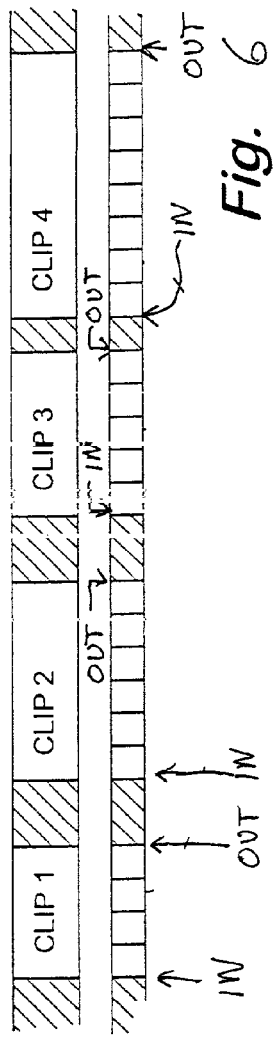
Fig. 6
Fig. 5
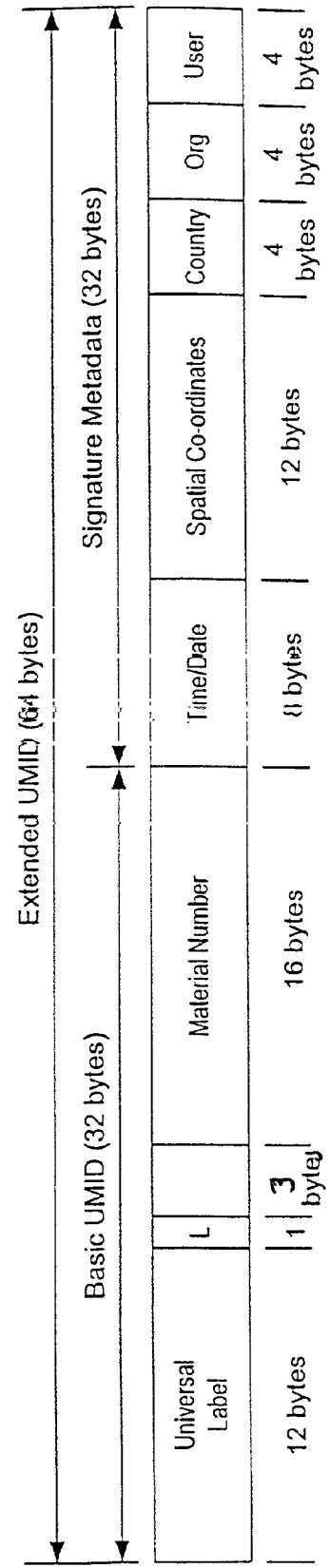
Fig. 4  Basic and Extended UMID Structures.

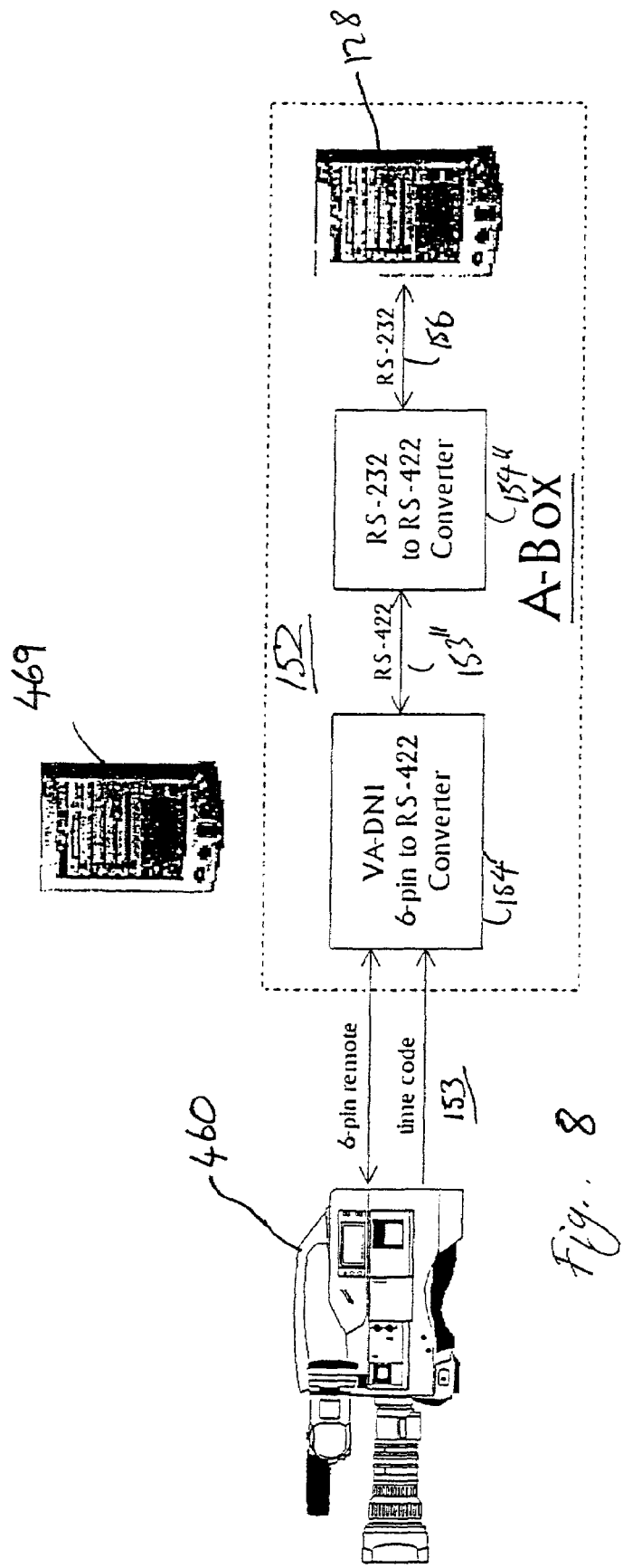

RECORDING AND ACCESSING METADATA

BACKGROUND OF THE INVENTION

1. Field of the Invention

The present invention relates to recording and accessing metadata relating to recorded material. The present invention also relates to using the recorded metadata to access further metadata.

2. Description of the Prior Art

In embodiments of the present invention, the recorded material comprises video and may also comprise audio information. Metadata is data relating to the recorded information.

In embodiments of the present invention, the recorded material comprises video information, and may also comprise audio information. In the embodiments of the present invention metadata is information related to the recorded video information (and the audio information if provided). The following refers to video information by way of example, and for clarity, but in its broadest aspects the ideas of the invention may be applied to other data.

When a video sequence is recorded it is essential to at least identify the data carrier, such as tape or disc, on which it is recorded. Conventionally the sequence is identified on a physical label attached to the carrier. It is also desirable to record such data on the carrier with the video sequence. The recorded data is one example of metadata. However, it is naturally desirable to maximise the video information recorded so as to aid video production operations. The video information is recorded on tape in helical scan tracks. Linear control and time code tracks are also provided on the tape. Also audio information, and control information such as time codes are typically recorded in the helical tracking. A linear audio cue track may also be provided on the tape [1]. Consequently, there are problems of: how or where to record metadata; and what metadata to record on a data carrier so as to provide useful information but at the same time to minimise the information recorded.

One way of identifying material recorded on a data carrier or recording medium is to use a UMID which is a Unique Material Identifier. A basic UMID has 32 bytes; an extended UMID has 64 bytes. The paper "Essence & Metadata Linking via the UMID" IEE NBSS 6 Jul. 1999 by J. H. Wilkinson, Sony B. P. E, UK. describes the SMPTE UMID and describes how a UMID carried with the "Essence" i.e. raw picture/audio information, may be used to link that Essence to other metadata stored in a computer storage system. The UMID may be carried in the VBI (Vertical Blanking Internal) of the video, or embedded in user bits of an AES 3 Audio Channel, if such an Audio channel is provided.

Using the VBI or the AES 3 audio channel for the recording of metadata, reduces the space available on a carrier, e.g. a disc or tape, to record the video or audio information on for audio. If the video is MPEG and the VBI data is stored in the Video-Elementary Stream (V-ES) it may reduce the space available for the compressed video bitstream.

At present, tape is the predominant medium for recording video. There are a variety of tape formats used in video production. It is desirable to record metadata on a tape in such a way that it can be recorded on as large a variety of tape formats as possible and preferably on any existing tape format. It is also desirable to store a large body of metadata relating to material recorded on a tape. It is also desirable to record metadata relating to material recorded on other forms of recording media, especially discs.

According to one aspect of the present invention there is provided a method of recording information relating to a sequence of data fields, each of which fields has associated therewith a code identifying the said field, the code having bits which identify the fields and user bits which are definable by a user, in which method bits of additional data relating to the said sequence, and comprising a number of bits greater than the number of user bits in a single field identifying code, are allocated to user bits of a plurality of field identifying codes of the said sequence.

Most preferably, the data fields are video fields and the codes are time codes. The data is preferably recorded on a medium such as tape or disc. Preferred embodiments of the invention concern tapes. Putting the additional data into the user bits of the time codes, allows the data to be recorded in any known tape format, it being believed that all known tape formats have time codes with user bits. In a most preferred embodiment of the invention, the said additional data which is recorded in the time codes is a medium identifier which distinguishes the example of the medium e.g. tape, disc or other recording medium from other examples thereof.

SUMMARY OF THE INVENTION

According to another aspect of the present invention there is provided a method of recording, on an example of a recording medium, information relating to a sequence of data fields, each of which fields has associated therewith a code identifying the said field, the code having bits which identify the field and user bits which are definable by a user, in which method bits of additional data distinguishing that example of the medium from other examples thereof are allocated to user bits of at least one field identifying code of the said sequence.

In a preferred embodiment, the additional, distinguishing data has a number of bits greater than the number of user bits of one time code. For example, the distinguishing data may occupy the user bits of two time codes. In that example there is one piece of distinguishing data in a video frame of two fields and preferably, the distinguishing data is repeated every frame.

Thus an organisation may apply serial numbers to all its recording media, e.g. tapes and/or discs. Those serial numbers are examples of the distinguishing data. Such serial numbers have fewer bits than a basic UMID. UMIDs are universally unique. The distinguishing data is unique to the organisation but may not be universally unique in that another independent organisation might adopt the same, or an overlapping set of, serial numbers.

A recording medium so identified may contain two or more pieces of video material which need to be identified. However the distinguishing data identifies the medium. Thus in accordance with a further aspect of the invention, there is provided a method of uniquely identifying material record on an example of a recording medium, which medium has recorded thereon distinguishing data distinguishing that example from other examples thereof, the method comprising the steps of: recording data indicating the start and end point of the or each piece of material recorded on the medium; reproducing the distinguishing data and reproducing the start and end data; generating a unique identifier for the or each said piece of material; and associating the reproduced distinguishing data and start and end data with the unique identifier.

The start and end codes are preferably recorded in a memory device separate from the device which reproduces them. Preferably the said unique identifier is a UMID. Thus material can be uniquely identified by recording on the medium only a medium identifier (i.e. the distinguishing data) which may have small number of bits relative to a UMID, start and end codes which are conventionally provided in recordings and so do not add to the amount of data to be recorded, and separately associating that data with the unique identifier, e.g. a UMID. The association of the unique identifier with the medium identifier and the start and end codes of a piece of recorded material may occur in a computer which receives the medium identifier and the start and end codes via a communications link, automatically generates the unique identifier and automatically associates the unique identifier with the received medium identifier and the start and end codes. The said computer may be running a database program in which it stores the unique identifier and the associated medium identifier and the start and end codes. In a currently preferred embodiment, the unique identifier and the associated medium identifier and the start and end codes are transferred from the computer, which may be a PDA (Personal Digital Assistant), via a data transmission link to a separate computer running a database program.

The database program associates the unique identifier and the associated medium identifier and the start and end codes with other metadata relating to the sequence of data fields.

An embodiment of the invention comprises apparatus which uniquely identifies material recorded on an example of a recording medium. The medium has distinguishing data, a tape ID, distinguishing that example from other examples thereof recorded thereon. A generator generates data, e.g. IN and OUT time codes, identifying the or each piece of material recorded on the medium. A recorder records the said distinguishing data on the medium. A reproducer reproduces, from the recording medium, the distinguishing data. A processor, e.g. a PDA, associates the reproduced distinguishing data and the said identifying data with a unique identifier, e.g. a UMID, for the or each piece of material. A database associates the unique identifier with metadata relating to the material.

That and other aspects of the invention are set out in the accompanying claims to which attention is invited.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 shows the structure of a basic and extended UMID;

FIG. 5 shows a modified UMID;

FIG. 6 shows by way of example the association of metadata with clips;

FIG. 8 is a schematic block diagram of a data acquisition unit.

DESCRIPTION OF THE PREFERRED EMBODIMENTS

Overview

Figure 1:
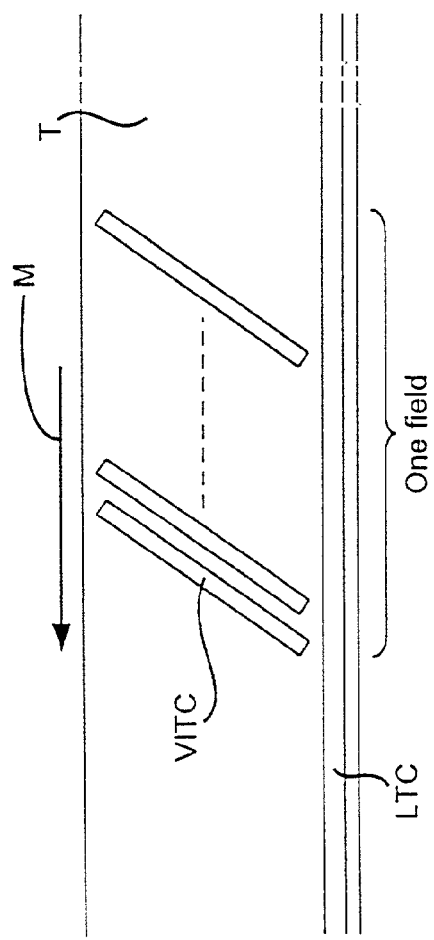
FIG. 1 schematically illustrates a known tape format.

Referring to FIG. 1, a tape format is shown schematically. Video and audio information is recorded in helical tracks of which a set of, e.g. 10 or 12, tracks records one field of video. The helical tracks include vertical interval time codes (VITC). The time codes may be duplicated in a linear time code track LTC, but the contents of the VITC and LTC may be different. The tape may comprise at least one other linear track (not shown). In this illustrative description it is assumed that all video, audio and other information is recorded digitally. However, the video and audio may be recorded as analogue information. The video and audio information may be compressed according to the MPEG 2 standard for example.

Figure 2:
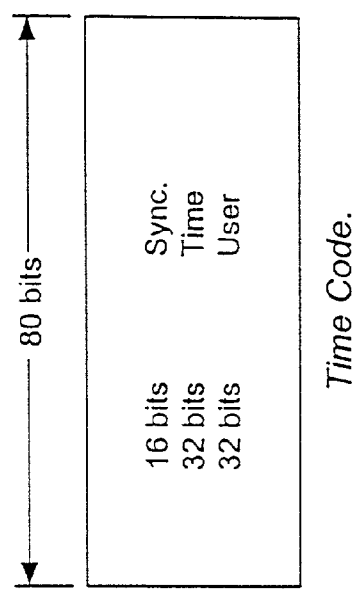
FIG. 2 schematically illustrates a time code.

The time codes are recorded once per video field. As schematically shown in FIG. 2, a known time code has 80 bits of which 16 are reserved for synchronisation information, 32 for time code bits and 32 for user defined bits, herein referred to as "user bits". The user bits are interleaved with the other bits in a typical time code; however the invention is not limited to that.

Metadata

Metadata is described in the section Metadata

Tape IDs and UMIDs

Figure 3:
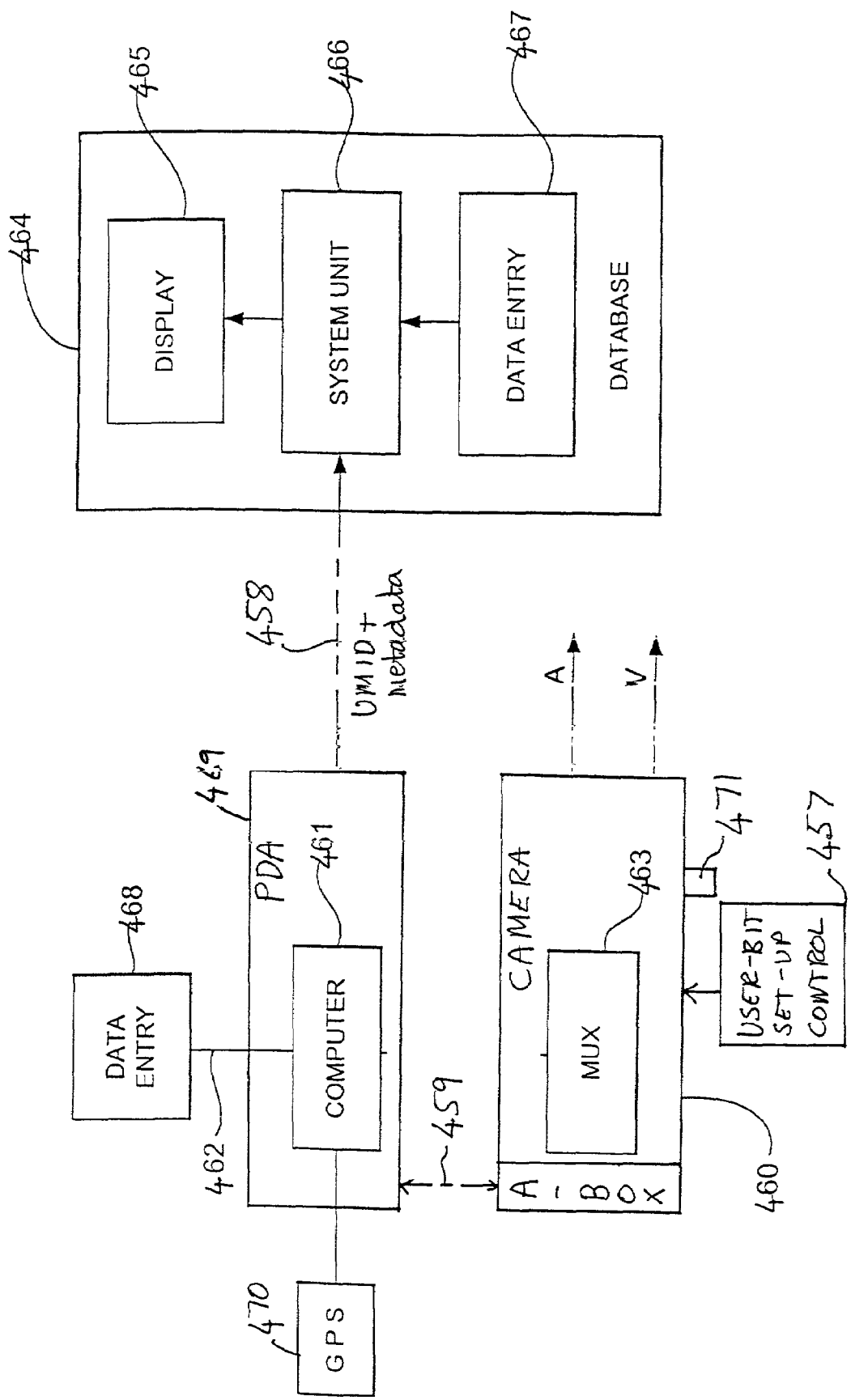
FIG. 3 schematically illustrates a system in which a database is accessed using metadata recorded with video and audio material in accordance with the present invention.

UMIDs are described in the section UMIDs. They are material identifiers which are universally unique. In embodiments of the present invention they are used to bind material i.e. video and/or audio recorded on the tape to metadata which is stored in for example a database 464 as shown in FIG. 3.

Embodiments of the present invention record, on the tape, Tape Identifiers (Tape IDs) having most preferably 64 bits. Tape IDs may have other numbers of bits for example in the range 32 to 64 bits. Unlike a UMID which is universally unique, a Tape ID may not be universally unique but is unique to at least an organisation such as a production company. The Tape ID is recorded in the user bits of the linear time code. If it has 64 bits it occupies two time codes. It thus refers to one frame of two video fields. In preferred embodiments the same tape ID is repeated every frame. Preferably, the tape is "prestriped" before use to record linear time codes for the fields.

The format of an illustrative Tape ID is any 4 byte hex number as set by the user-bit set-up controls (457 in FIG. 3) on the VTR or camcorder.

Linking to a UMID

The Tape ID may not be unique. In embodiments of the present invention, a Tape ID is linked to a UMID which uniquely identifies the material recorded on the tape. The UMID is used to link the material on the tape to other metadata relating to the material. If only one piece of material is recorded on a tape, then only the Tape ID needs to be linked to the UMID which uniquely identifies that one piece of material. However, in practice two or more pieces of material would be recorded. For example, the tape may contain two or more takes of the same shot: each take is one piece of material and has its own UMID. Thus to link each UMID to each piece of material, the Tape ID plus the IN (start) and OUT (end) time codes of the piece of material are used.

Linking to a Database

It is desirable to provide more detailed metadata relating to the material recorded on the tape. Examples of such metadata are described in the section Metadata. Thus metadata is stored in a database, the UMID linking the metadata to the material.

Illustrative System

Referring to FIG. 3, a digital video source, e.g. a camcorder 460 has a multiplexer 463 which in known manner inserts the Tape ID and the IN and OUT time codes onto a tape. The IN and OUT time codes are generated each time a record start and stop button 471 is operated. The tape ID is generated as follows:—

The camcorder records a contiguous set of time codes for all fields; the tape ID is fixed, recorded in the time code user bits and is preset by the user-bit set-up controls. The camera also outputs audio A, video V on respective outputs.

The camera has a signal processor termed herein the A-BOX. An example of an A-box is described in the section 'A-box' below. The A-box stores time codes indicating the beginning and end of a recording, i.e. the IN and OUT points. The user bits form part of the time code and thus the tape ID is monitored by monitoring the user bits, whereby the tape IDs are stored with the IN and OUT points. The A-box derives the user bits of the time codes from the tape and transfers them to a data processor which in this example is a PDA (Personal Digital Assistant) 469, which includes a computer 461. It may derive other metadata from the camera and/or material recorded on the tape and transfer it to the PDA 469.

The PDA 469 links the Tape ID and the IN and OUT time codes of the pieces of material recorded on the tape to one or more UMIDs. The PDA has a data entry device, for example a keyboard, to enter data and may have, or be connected to, a GPS device 470 for producing the spatial co-ordinate data of an extended UMID. The PDA generates the UMID and associates it with the Tape ID and the IN and OUT codes. The PDA 469 transfers the UMIDs, Tape IDs, IN and Out points, and any other metadata generated at the camera and/or PDA, to a database 464.

The database 464 in this example comprises a data base program run on a standard personal computer (PC) or a lap-top computer having a keyboard 467 for data entry, a display 465 and a systems unit 466.

The database 464 stores more extensive and detailed metadata, including the UMID(s), the tape IDs, the IN and OUT points and other metadata generated at the Camera 460, the PDA 469 and/or the data entry device 467. The Tape IDs and the IN and OUT points on the tape and the UMID(s) in the database allow clear and unique linking of the material on the tape, and of the tape on which the material is recorded, to the data in the database.

Metadata, which is additional to the UMID, may be entered into the PDA 469 by the operator using the keyboard 468. The computer 461 in the PDA generates the UMID (whether basic or extended or having the data-reduced structure as shown in FIG. 5 of the section UMIDs) and formats the other metadata into a suitable data structure for transfer to the database 464.

Interconnecting the Camera, PDA and Database.

Data transfer between the A-box and PDA may be by corded or wireless link 459. For example the PDA may have in Infra Red port for the transfer of data linking with a corresponding Infra-Red port on the A-Box. Likewise the PDA may be linked to the database by a corded or wireless link. The link from the PDA to the database may be via a telephone link, or by direct radio link. The PDA may be linked to the database via the internet.

Modifications.

The 'A-Box' and the PDA 469 are shown as items separate from the camera 460. The A-box may be replaced by a processor, e.g. a computer built into the camera. Alternatively both the A-Box and the PDA may be replaced by a processor built into the camera.

UMIDs

A UMID is described in reference [2]. Referring to FIG. 4, an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 5, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 1) has 4 separate values to identify each of 4 different data types as follows:
'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17 Nov. 1858 and allows dates to the year 4597.

The Spatial Co-ordinate Format

The spatial co-ordinate value consists of three components defined as follows:
Altitude: 8 decimal numbers specifying up to 99,999,999 meters.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

FIG. 6 illustrates a sequence of clips having IN and OUT points. Each clip has a plurality of frames having time codes including user bits.

Metadata

Figure 7:
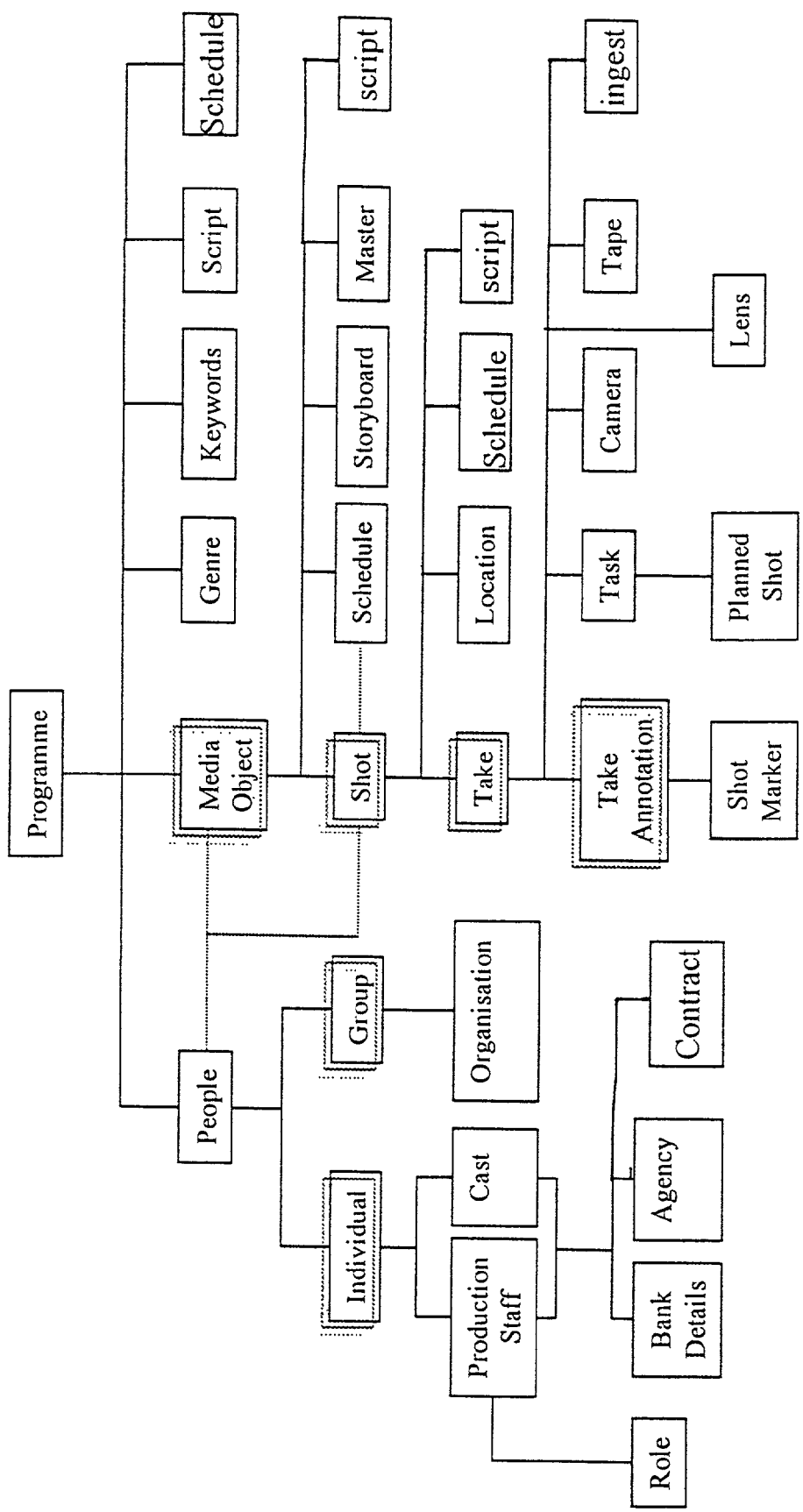
FIG. 7 shows an illustrative structure for metadata in a database.

The following description of FIG. 7 is provided, by way of example, to illustrate the possible types of metadata generated during the production of a programme, and one possible organisational approach to structuring that metadata in the database 464. The metadata in the database including at least the basic UMID and tape ID of a "take" allowing the metadata to be accessed via the UMID.

FIG. 7 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table.

The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB (Date of Birth), National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

A-box

Referring to FIG. 8, there is shown an illustrative block diagram of a combination of the camera 460, PDA 469 and the A-box 152. The A-box is a data acquisition unit. In the example shown in FIG. 8 the acquisition unit 152 is mounted on the back of a camera recorder 460 and coupled to the camera 460 via a six pin remote connector of the camera and to a connecting channel 153 conveying a signal representative of the time code recorded onto the recording tape of the camera recorder 460 and a signal representative of the tape ID recorded on the tape. An interface port 154 is shown in FIG. 8 to be a VA to DNI converter comprising an RM-P9/LTC to RS422 converter 154. Rm-P9 is a camera remote control protocol, whereas LTC is Linear Time Code in the form of an analogue signal. This is arranged to communicate with a RS422 to RS232 converter 154" via a connecting channel 153" which forms part of the interface port 154. The converter 154" then communicates with a processor 128 via the connecting channel 156 which operates in accordance with the RS 232 standard. In this example processor 128 is another PDA which communicates with the PDA 469. PDAs 469 and 128 communicate via an infra-red link shown as 459 in FIG. 3.

Whilst the invention has been described by way of example with reference to tape, the invention may be applied to other recording media. For example tapes may be replaced by discs such as optical or magneto-optical discs or by computer hard discs.

REFERENCES

[1] Introduction to the 4:2:2 Digital Video Tape Recorder—Stephen Gregory Pentech Press 1998, ISBN 0-7273-0903-X
[2] EBU/SMPTE Task Force for Harmonised Standards for the Exchange of Programme Material as Bit Streams, Final Report: Analyses and Results, Sep. 1998.
[3] EBU/IFTA Forum "Paving the Way to Future TV Archives", Vienna, 18 Jun. 1999, M. F. Vetter, TASC Inc.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of uniquely identifying material recorded on a recording medium, the method comprising:
    recording data identifying the location of the or each piece of material recorded on the medium;
    reproducing distinguishing data from the recording medium, the distinguishing data distinguishing the recording medium from other examples thereof;
    reproducing the identifying data;
    generating a globally unique identifier for the or each said piece of material; and
    associating the reproduced distinguishing data and the identifying data with the globally unique identifier,
    wherein the material is recorded as a sequence of data fields, each field of each of a material item having an associated code identifying said field, the code having bits which identify the field and user bits which are definable by a user, the distinguishing data being stored in the user bits of at least one field identifying code of said sequence.

2. The method according to claim 1, wherein said identifying data is data indicating a start and an end point of the or each piece of material recorded on the medium.

3. The method according to claim 1, further comprising the steps of:
    transferring at least the globally unique identifier to a database; and
    associating the globally unique identifier with metadata relating to the material identified by the unique identifier.

4. The method according to claim 1, wherein the globally unique identifier is a UMID.

5. The method according to claim 1, wherein the recording medium is a tape.

6. The method according to claim 1, wherein the recording medium is a disc.

7. An apparatus for uniquely identifying material recorded a recording medium, the apparatus comprising:
    a generator for generating data identifying the location of the or each piece of material recorded on the medium;
    a recorder for recording said identifying data on the medium, wherein the identifying data is a sequence of data fields, the recorder comprising:
    a first generator configured to generate for each of the fields of each of a material item, a code identifying said field,
    the code having bits which identify the field and user bits which are definable by a user;
    a second generator configured to generate bits of the distinguishing data; and
    a multiplexer configured to insert the bits of distinguishing data into the user bits,
    the multiplexer being arranged to allocate the distinguishing data to user bits of at least one field identifying code of said sequence;
    a reproducer for reproducing, from the recording medium, distinguishing data, the distinguishing data distinguishing the recording medium from other examples thereof; and
    a processor for associating the reproduced distinguishing data and said identifying data with a globally unique identifier for each said piece of material.

8. The apparatus according to claim 7, wherein the identifying data is recorded on the medium.

9. The apparatus according to claim 7, wherein said processor is arranged to generate the globally unique identifier.

10. The apparatus according to claim 7, wherein said identifying data is data indicating a start and an end point of the or each piece of material recorded on the medium.

11. The apparatus according to claim 7, further comprising:
    a database processor; and
    a data link configured to transfer at least the globally unique identifier to a database,
    the database processor being arranged to associate the unique identifier with metadata relating to the material identified by the globally unique identifier.

12. The apparatus according to claim 7, wherein the globally unique identifier is a UMID.

13. The apparatus according to claim 7, wherein the recording medium is a tape.

14. The apparatus according to claim 7, wherein the recording medium is a disc.

* * * * *